No. 675,507. Patented June 4, 1901.
W. S. CASE.
CAN SOLDERING APPARATUS.
(Application filed Oct. 26, 1900.)
(No Model.) 2 Sheets—Sheet 1.

Witnesses: E. A. Brandau, G. H. Wise

Inventor: Wilmer S. Case
By Dewey Strong & Co., Attys.

THE NORRIS PETERS CO., PHOTO-LITHO., WASHINGTON, D. C.

No. 675,507. Patented June 4, 1901.
W. S. CASE.
CAN SOLDERING APPARATUS.
(Application filed Oct. 26, 1900.)
(No Model.) 2 Sheets—Sheet 2.

UNITED STATES PATENT OFFICE.

WILMER S. CASE, OF HAYWARD, CALIFORNIA.

CAN-SOLDERING APPARATUS.

SPECIFICATION forming part of Letters Patent No. 675,507, dated June 4, 1901.

Application filed October 26, 1900. Serial No. 34,443. (No model.)

*To all whom it may concern:*

Be it known that I, WILMER S. CASE, a citizen of the United States, residing at Hayward, county of Alameda, State of California, have invented an Improvement in Can-Soldering Apparatus; and I hereby declare the following to be a full, clear, and exact description of the same.

My invention relates to an apparatus which is especially designed for soldering polygonal cans on lines where the heads and sides are joined.

The invention is here shown as applied to the soldering of the end seams of rectangular cans which have greater dimension in one direction than the other.

It consists of mechanism whereby the cans are delivered from a feed or supply chute to holders and by these holders transferred, so that the edges to be soldered will be successively dipped into the solder-bath, where they will remain a sufficient length of time, mechanism by which the cans are rotated at stated intervals, so that each edge is submerged in the solder while the can is passing the length of the solder-bath.

My invention also comprises a means for presenting and inserting the cans to the holders and of discharging them therefrom at the end of the apparatus.

It also comprises details of construction, which will be more fully explained by reference to the accompanying drawings, in which—

Figure 1:
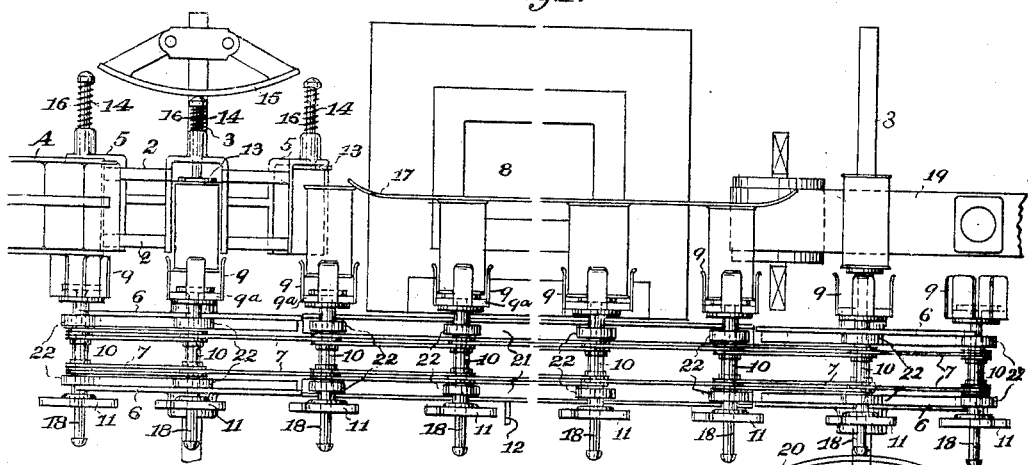
Figure 2:
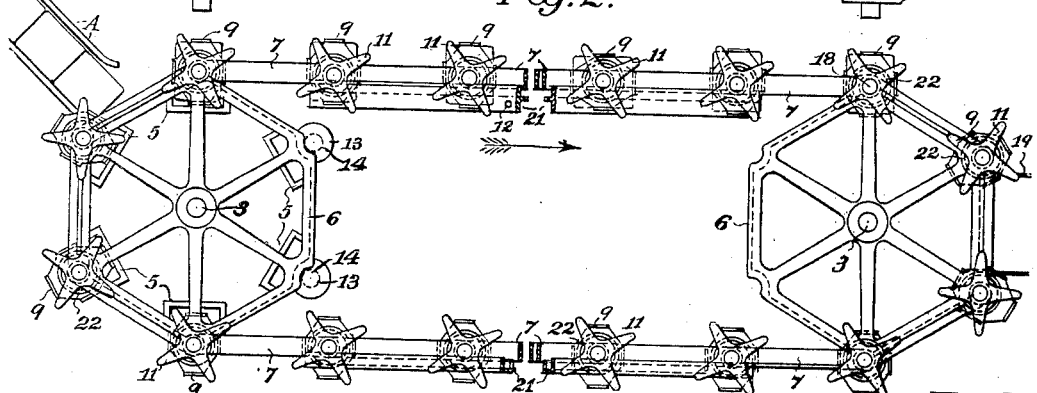
Figures 3, 4, 5:
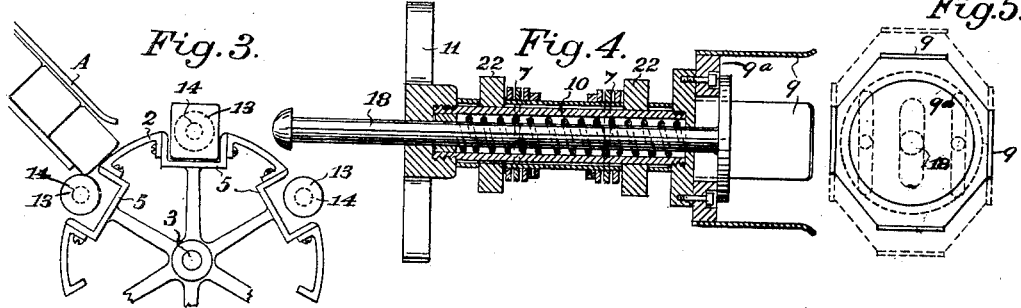
Figure 6:
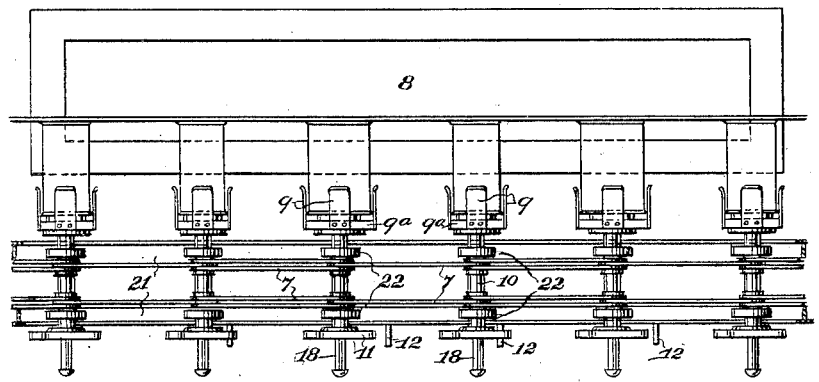
Figure 7:
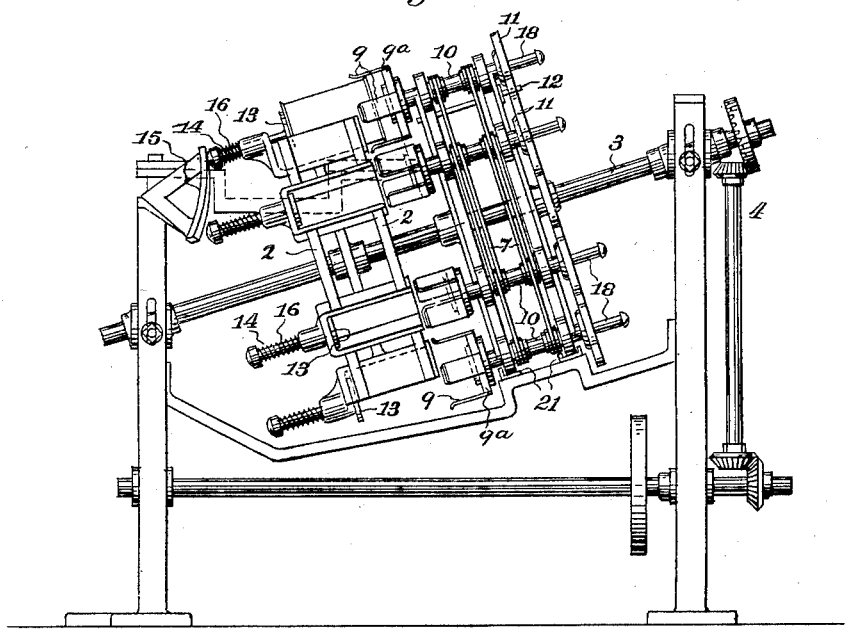

Figure 1 is a plan of my apparatus. Fig. 2 is a longitudinal elevation. Fig. 3 is a view of the revoluble carrier. Fig. 4 is an enlarged longitudinal section through a holder or carrier. Fig. 5 is an end view of the same. Fig. 6 is a plan of an intermediate portion belonging to Fig. 1. Fig. 7 is an end elevation of the apparatus.

In the automatic soldering of square or polygonal cans it is necessary to turn the cans intermittently, so as to submerge the edges in the solder long enough to allow the solder to soak into the joint. It is also necessary to submerge each successive edge of the can in the solder before the can is finally discharged from the apparatus.

My present invention comprises improvements in the delivery of the cans to and from the apparatus and in the construction of the holder and its supporting parts.

A is a chute of any suitable description, into which the cans are placed upon their sides, and 2 is a cylindrical revoluble carrier mounted upon a shaft 3 and driven by suitable intermediate mechanism, as at 4, from the main power-shaft, which is journaled in the frame of the machine. The periphery of the carrier has rectangular pockets 5, adapted to receive the cans as they are delivered from the chute A. Each succeeding can drops into one of the depressions 5, and as the carrier rotates the next succeeding can will rest upon the bridge or curvature between the depressions until the next depression arrives in line with the can, when it in turn will drop into a depression and be moved from the line of the chute.

The apparatus comprises two chain-carrying wheels 6, turnable in unison with the carrier, and a chain 7, which extends around the chain-wheels and is of sufficient length to carry any required number of cans.

The cans are transmitted through a solder-bath 8 by means of holders 9, and these holders are attached to the traveling chain 7 in such a manner that they hold the cans with the end to be soldered in such position that as the chain travels along one edge of the can will be submerged for a short time in the molten solder in the bath. The holders are turned periodically so that the next edge is presented, and thus until all the edges at that end of the can have been submerged in the solder, after which the cans are discharged, as will be hereinafter described. The holders consist of a base-plate suitably shaped and having projecting fingers, as shown, between which the can is held during its progress through the apparatus. Each holder is mounted upon a shaft, which is journaled and turnable upon the traveling chain 7. As at present shown, the shaft is tubular, as shown at 10, and one end is secured to the base-plate of the holder and the other to the hub of a star-wheel 11, as seen in Fig. 4. The intermediate portion of the tubular shaft is turnable in bearings upon the chain. From a support, which is fixed with relation to the traveling chain, project pins or studs 12 at such intervals as the shape, size, and number of sides of the can make necessary. The pins are so located with relation to the star-wheels 11 that as the latter reach these pins in their progress the pins acting upon the arms of the star-wheels turn them a part of a revolution and with them turn the holders and cans, so that a can is moved along by the chain with one of its edges submerged in the solder-bath until the star-wheel on the shaft of its holder arrives at one of the studs 12, when its engagement with that stud will cause it to be turned and with it the holder and the can, so as to present another edge of the can end, which in turn remains submerged while the can is traversing the distance between the next two of the studs which rotate the star-wheel. In this manner each edge of the can will be submerged and soldered.

In order to place the cans in the holders 9, I have shown plungers 13, carried upon stems 14, which are slidable in line with the depressed receivers 5 of the rotary carrier 2. At a proper point with relation to these plungers is mounted a fixed cam 15, which is in line with the heads of the plunger-stems 14. These plungers and their stems are normally retracted, and the plungers are withdrawn by means of springs 16, which surround the plunger-stems and act to retract them; but when the end of a plunger-stem arrives at the cam 15 the action of the cam will force the plunger inward and will thus push the can out of its carrier 5 and into the holder 9 of the traveling chain which is in line therewith. As the cans are thus transferred from the rotary and intermediate carrier 2 to the holders 9 and at the instant when the rotation of carrier 2 has brought them into such position that the chain commences to carry the cans away from this preliminary feeder the cam 15 will have released the plunger-stems, and the spring 16 will then retract the plungers, so that the chambers 5 will be in condition to receive another can when the carrier has completed its revolution. When the cans have been placed in the holders 9 and the continued movement of the chain carries the holders toward the solder-bath, the ends of the cans will travel against the guide-bar 17, the entering end of which is curved outwardly sufficiently to insure the cans passing the end. During the rest of their progress the cans rest against this bar, with the lower edge dipping into the solder, and are turned at intervals, as before described. The base $9^a$ is slotted in the center to allow the plunger-stem 18 to slide freely through this slot, and slots are made upon each side, through which pins pass to secure the holder to the flange of the tubular shaft 10, but at the same time to allow the holder to slide transversely with relation to the shaft and plunger-rod whenever the can is turned to submerge another edge in the solder. This sliding movement is necessary on account of the angular form of the can and the greater distance between the central axis and the corners over the distance from said axis to the middle of the sides. When the cans have thus passed through the solder-bath and the work completed, they are discharged from the holder by means of the plungers $18^a$. The stems of these plungers extend through the base-plate $9^a$ and the tubular shaft 10. In order that the holder may accommodate itself to the angular shape of the irregular can, the base-plate $9^a$ is slotted, as shown in Fig. 5, for the movement of the stem 18 and the pins by which the holder is secured to the shaft 10. These slots allow the holder to slide transversely with relation to the shaft and plunger-rod wherever the can is turned to submerge another edge in the solder. The sliding movement is necessary on account of the angular form of the can and the greater distance between the central axis and the corners over the distance from said axis to the middle of the sides.

The ejection of the cans from the holders is effected by the contact of each plunger-stem 18 with a cam 20, fixed with relation to the moving parts of the apparatus, so that each plunger-stem will successively contact as it passes with the cam and the plunger within the holder will be pressed forward, so as to eject the can from the holder. A spring surrounding the plunger-stem 18 retracts the plunger as soon as its stem has passed the fixed cam. From the holders the cans are received in an upright position upon a carrying-belt 19, whence they are delivered to any desired point. This change of the can from a horizontal to a vertical position is effected by means of the inclination of the machine, as shown in Fig. 7, and the fact that the belt 19 is on a plane relatively lower than the discharging-holder, so that when a can is pushed out it naturally falls free end first by force of gravity into a vertical position. In order to steady the chain and keep it in proper line as it travels between the wheels around which it passes, I have shown angle-iron guides 21 fixed along the line of travel of the chain, and rollers 22 upon the shafts of the holders 9 travel in these angle-iron guides, and thus prevent any side movement of the chain, which would interfere with the proper relation of the cans to the solder-bath while traversing it.

Having thus described my invention, what I claim as new, and desire to secure by Letters Patent, is—

1. In an angular-can-soldering machine, the combination of an endless traveling belt and belt-carrying wheels around which it travels, rotatable shafts journaled upon the belt and can-holders mounted upon said shafts, a solder-bath so located that the edges of the cans carried by the holders are successively submerged therein while the can is being carried from one end to the other of the bath, channeled guides fixed with relation to the belt, and rollers fixed directly to the shafts, one on each side of the belt, and traveling in said guides and adapted to prevent side movement of the belt, and means for rotating the holders in the direction of the travel of the belt while the rollers are traveling through the guides.

2. In an angular-can-soldering machine, the combination of an endless traveling belt, wheels around which the belt passes, can-holders having shafts journaled upon said belt, a revoluble feeder having peripheral depressions to receive the cans, means for delivering the cans to the feeder, a solder-bath so located with relation to said belt and can-holders that the can edges may be submerged in the solder, and fixed guides for maintaining the belt and cans in their line of travel through the bath.

3. The combination with an endless traveling carrier, can-holding devices operating therewith and a can-chute, of a revoluble can-feeder in line with the chute and having chambers in which the cans are received and from whence they are delivered to the can-holders.

4. The combination of a can-carrier provided with can-holding devices, of means for feeding the cans to the holding devices including a chambered revoluble structure and means for removing the cans from the chambers and depositing them into the holders.

5. The combination with a can-carrier of a feeder having peripheral chambers into which the cans are received, can-holders adapted to be brought into line with said chambers, and means for moving the cans endwise into the holders when the latter aline with the chambers.

6. In an angular-can-soldering machine, an endless traveling belt and holders carried thereby, a chute by which the cans are brought to the apparatus, a revoluble feeder having depressions upon its periphery, and means for moving the feeder in unison with the movements of the can-holders whereby each can-holder is brought into line with a feeder, and means for ejecting the cans from the feeder into the holder.

7. In an angular-can-soldering apparatus, an endless belt, can-holders carried thereby, and a solder-bath through which the cans are moved by said holders, a feed-chute and a revoluble chambered feeder in line therewith into which the cans are successively received, and by which they are transmitted into line with the can-holders, plungers, the stems of which are slidable through the hollow shafts of the holders, a fixed cam to engage the plunger-stems and eject the cans from the feeder into the holders, and a spring by which the plunger and its stem are retracted after passing the cam.

8. In a can-soldering machine, the combination of an endless traveling belt, can-holders having shafts journaled and turnable upon said belt, a solder-bath so located with relation to the belt that cans carried by the holders have their edges submerged in the solder, star-wheels carried by the holder-shafts, and fixed spurs against which the arms of the stars contact as the belt advances to turn the cans and successively submerge the edges to be soldered, a revoluble feeder having peripheral chambers in which the cans are received, means for delivering the cans from said chambers to the can-holders, and mechanism slidable transversely to the holder-shafts to allow the cans to move out of their line of travel when turning over their corners.

9. In a can-soldering machine, an endless traveling chain belt, can-holders having tubular shafts journaled and turnable upon the belt, and star-wheels fixed to the outer ends of said shafts, a revoluble can-feeder having peripheral chambers into which the cans are received, means delivering the cans from the feeder to the can-holders, plungers fitting within the can-holders and having stems extending through the hollow shafts, fixed cams against which the ends of the stems contact as they pass whereby the plungers are advanced and the cans forced out of the holders after leaving the solder-bath, and springs by which the plungers are retracted after passing the cam.

In witness whereof I have hereunto set my hand.

WILMER S. CASE.

Witnesses:
S. H. NOURSE,
CHAS. E. TOWNSEND.